UNITED STATES PATENT OFFICE.

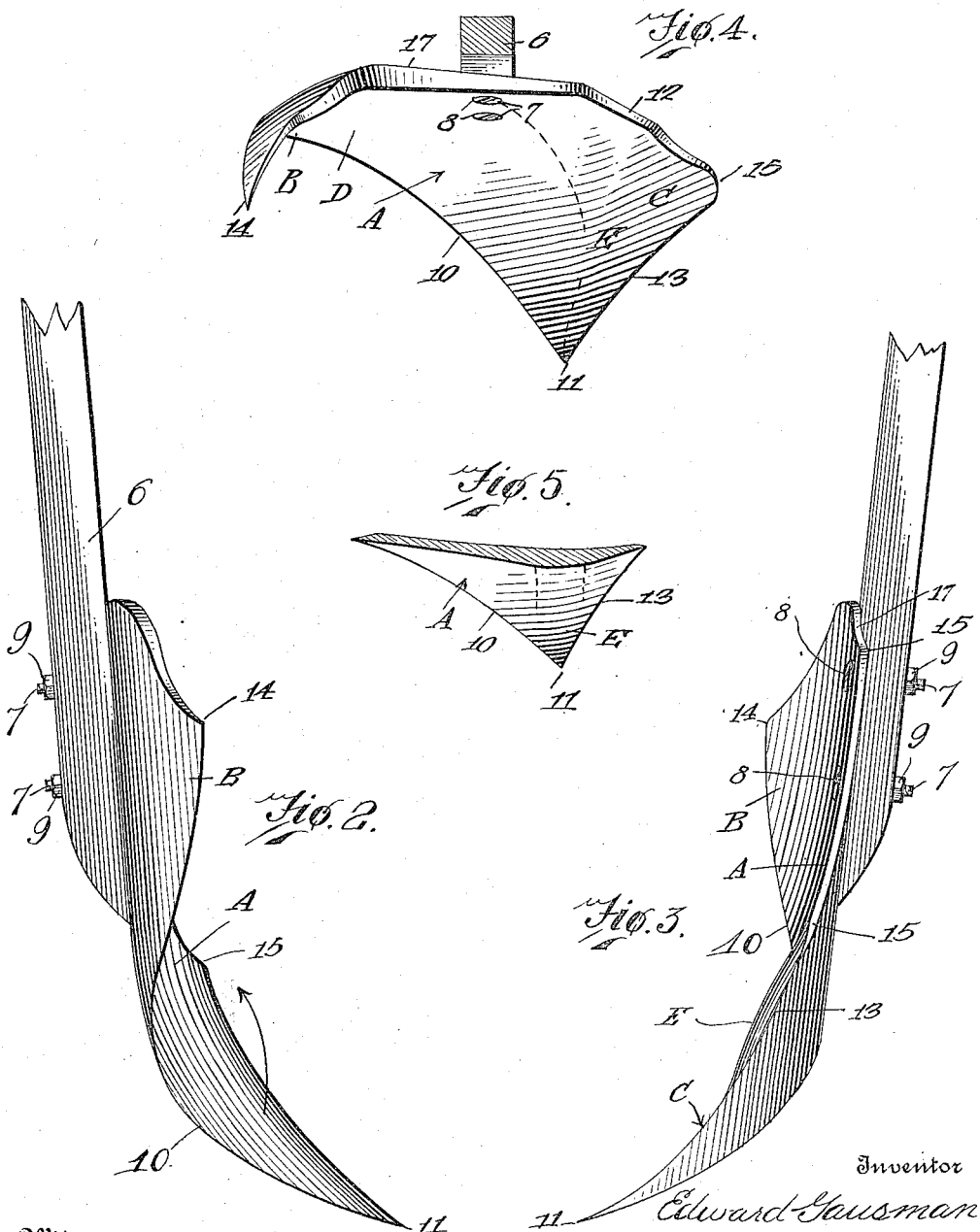

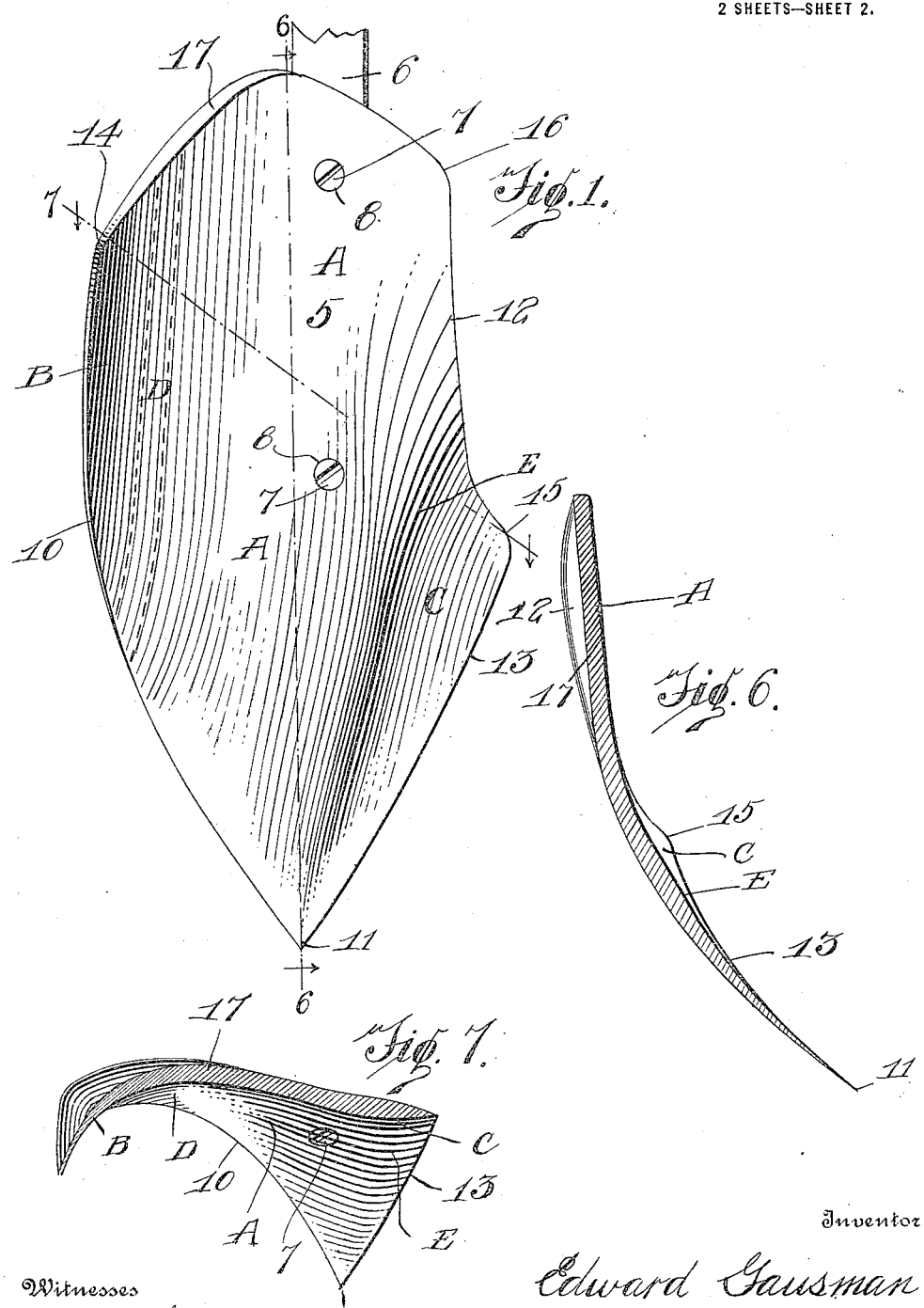

EDWARD GAUSMAN, OF CENTRAL CITY, NEBRASKA.

FENDER-SHOVEL.

1,165,965. Specification of Letters Patent. Patented Dec. 28, 1915.

Application filed August 19, 1914. Serial No. 857,553.

*To all whom it may concern:*

Be it known that I, EDWARD GAUSMAN, citizen of the United States, residing at Central City, in the county of Merrick and State of Nebraska, have invented certain new and useful Improvements in Fender-Shovels, of which the following is a specification.

This invention relates to shovels, plow blades and the like and has particular reference to that type of shovel employed by ground cultivators and similar farming implements.

As a principal object, this invention contemplates the provision of a cultivator shovel or plow which shall present a peculiar and novel warped surface tending to greatly increase the advantageous use thereof.

A further object is to construct a cultivator shovel with a warp or twist in such manner as to dispense with any form of shield or guard which is ordinarily used with such implement to prevent injury to plants in the ground being cultivated.

An object of equal importance with the foregoing is to furnish a plow or shovel of the character set forth which may be constructed with such regard to proportion, and to the arrangement and curvature of its surfaces, as to be cheaply manufactured while at the same time durable and efficient in operation.

The above and additional objects which will become apparent as this explanatory description proceeds, are accomplished by such means as are illustrated in the accompanying drawings, described in the specification and then more particularly pointed out in the claims which are appended hereto and form a part of this application.

With reference to the drawings, wherein there is illustrated the preferred embodiment of this invention, as it is reduced to practice, and throughout the several views of which like characters of reference designate similar parts:—Figure 1 is a front elevation of the shovel comprehended by this invention, Figs. 2 and 3 are opposite side elevations thereof, Fig. 4 is a plan view of the shovel, Fig. 5 is a sectional detail illustrating the formation of the shovel point, and Figs. 6 and 7 are respective sectional views taken on the lines 6—6 and 7—7 of Fig. 1.

Before taking up the description of the drawings, it is desired to emphasize the fact that although this invention has been designed with particular reference to the needs of cultivator shovels, has been illustrated and will hereinafter be described in that connection, it may nevertheless be applied with equal efficiency to other forms of plows, shovels and the like tools, which must, accordingly, be considered as falling within the scope of this invention.

With reference to the drawings, there is illustrated a cultivator shovel designated 5 in its entirety and attached to the usual cultivator beam or support 6 by means of the screw bolts 7 which pass through the beam and shovel and are upset and countersunk as denoted at 8, the usual securing nuts 9 being also provided.

As particularly illustrated in Fig. 1, the shovel outline does not follow any rule of symmetry with respect to the opposite edges separately illustrated in Figs. 2 and 3. The edge 10 is reversely curved as illustrated in Figs. 2 and 3 to form a guard edge to direct the dirt or soil raised over the shovel point 11 by forward movement thereof to the cut away portion 12 of the opposite side 13. In this manner the employment of guard means for the shovel is dispensed with, the implement being made to form its own guard to direct a disposition of the displaced soil in such manner as not to injure plants near the roots of which the shovel or shovels may be operating. In use the edge 10 travels adjacent to the plant and the dirt is directed by such edge over the opposite edge 13 and away from the plant.

Since the shovel is cast, formed or otherwise suitably manufactured from a single piece of material, we may consider the surface thereof to include a number of minor surfaces for the purpose of a more exact description of the shovel's functions and qualities. The central surface of the shovel is designated A and is concaved forwardly extending in a somewhat diagonal manner downwardly toward that portion of the edge 10 adjacent the shovel point 11 in the manner best illustrated in Fig. 1. It is by way of this central surface that the soil displaced by the shovel point is forced upwardly to its point of removal from the shovel. The edge 10 is also formed in a concaved manner forwardly and extends from the point 11 to the shoulder 14 increasing upwardly in the degree of its concave curvature, this surface being denoted by the character B. The opposite edge 13 is the outer boundary of a surface C, which is slightly concaved forwardly as is apparent from an inspection of Fig. 6, this edge extending from the point 11 opposite to the edge 10 to a shoulder 15 which is formed by the cut away edge 12. This latter edge terminates in the upward shoulder 16 corresponding to the shoulder 14 and connected thereto by the back 17 of the shovel. This back and the edge 12 are formed of a heavy thickened material while the edges 10 and 13 are formed with knife like cutting edges for the customary purpose. Joining the concaved surfaces A and B which differ only in degree, and to some extent in slope, of curvature, is the intermediate connecting surface D also concaved and serving to mark the bending line upon which the surface B is warped forwardly from the central surface A. Similarly joining the central surface and the opposite edge surface C is the convex ridge surface E which merges into the surface A adjacent the cut away edge 12 and extends diagonally therefrom to the point 11, tending to restrain the soil passing upwardly from the point entirely to the central concave surface until it is to be laterally disposed over the edge 12.

From the foregoing, the operation of the shovel of this invention should be readily understood. As the plow travels forwardly in its path through the ground, the latter is forced upwardly over the central concave surface A and is guided therein by means of the surface B and the convex ridge E until succeeding portions of soil will displace the first portion over the side 12 between the shoulders 15 and 16. It will be recognized that means have been provided whereby the objects previously presented may be readily attained so that this invention may be claimed as possessing the advantages and desirability of such objects above mentioned.

While in the foregoing, however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:

1. A cultivating shovel including a concaved central surface, concaved edge surfaces, a concaved joining surface between said central surface and one of said edge surfaces, and a convex joining surface between said central surface and the other of said edge surfaces.

2. A cultivating shovel including a concaved central surface, an increasingly concaved guard surface, and a convexed ridge surface joining said central surface to maintain passing material therein between the ridge and the guard surfaces.

3. A cultivating shovel including sharpened edges intersecting in a point, one of said edges being reversely curved and forming the boundary of a guard surface, and the other of said edges being cut away as set forth.

4. A cultivating shovel including sharpened side edges intersecting in a point, a concaved central surface extending diagonally to one edge adjacent said point, the upper portion of the other edge being extended inwardly, the first said edge being reversely curved from said point, a concaved surface joining said central surface with first said edge, and a convexed surface between said central surface and second said edge.

5. A shovel including concaved side surfaces, knife edges bounding each one of said sides, said edges intersecting in a point, a cut away portion on one of said sides forming a shoulder, a diagonal central concaved surface between first said surfaces, a concaved joining surface integrally connecting said central surface with one of said side surfaces, and a convex joining surface similarly connecting said central surface with the other of said side surfaces, and providing a directing channel to dispose soil passing upwardly over said central surface over said shoulder.

In testimony whereof I affix my signature in presence of two witnesses.

EDWARD GAUSMAN.

Witnesses:
F. K. SPRAGUE,
J. OLIVER FOLT.

Copies of this patent may be obtained for five cents each, by addressing the "Commissioner of Patents, Washington, D. C."